US009529895B2

(12) United States Patent
Das Sarma et al.

(10) Patent No.: US 9,529,895 B2
(45) Date of Patent: Dec. 27, 2016

(54) METHOD AND SYSTEM FOR DISCOVERING DYNAMIC RELATIONS AMONG ENTITIES

(71) Applicant: Yahoo! Inc., Sunnyvale, CA (US)

(72) Inventors: Anish Das Sarma, San Francisco, CA (US); Alpa Jain, San Jose, CA (US); Cong Yu, Hokoken, NJ (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 0 days.

(21) Appl. No.: 14/526,613

(22) Filed: Oct. 29, 2014

(65) Prior Publication Data

US 2015/0074146 A1 Mar. 12, 2015

Related U.S. Application Data

(63) Continuation of application No. 12/958,151, filed on Dec. 1, 2010, now abandoned.

(51) Int. Cl.
*G06F 17/30* (2006.01)
(52) U.S. Cl.
CPC ... *G06F 17/30687* (2013.01); *G06F 17/30604* (2013.01)
(58) Field of Classification Search
CPC ........................ G06F 17/3064; G06F 17/3097
See application file for complete search history.

(56) References Cited

U.S. PATENT DOCUMENTS

| 2007/0006098 | A1* | 1/2007 | Krumm et al. ............... 715/825 |
| 2007/0143300 | A1 | 6/2007 | Gulli et al. |
| 2008/0010269 | A1 | 1/2008 | Parikh |
| 2009/0157618 | A1* | 6/2009 | Matheny ........................ 707/3 |
| 2010/0082658 | A1* | 4/2010 | Athsani et al. ............... 707/767 |
| 2011/0295875 | A1* | 12/2011 | El Daher et al. ............. 707/769 |
| 2011/0295903 | A1 | 12/2011 | Chen |
| 2012/0143875 | A1* | 6/2012 | Sarma et al. .................. 707/746 |

OTHER PUBLICATIONS

Nagarajan, et al., Altering document term vectors for classification ontologies as expectations of co-occurrence, Proceedings of the 16th International Conference on World Wide Web. ACM, 2007.
Ramakrishnan, et al., A framework for schema-driven relationship discovery from unstructured text. The Semantic Web-ISWC 2006 (2006) 583-596.

(Continued)

*Primary Examiner* — William Spieler
(74) *Attorney, Agent, or Firm* — Pillsbury Winthrop Shaw Pittman LLP

(57) ABSTRACT

Method, system, and programs for detecting dynamic relationship and discovering dynamic events. Data from a first data source is first received. At least one dynamic relation candidate is identified and each dynamic relation candidate involves multiple entities. The at least one dynamic relation candidate is identified based on temporal properties with respect to the entities exhibited in the data from the first data source. Dynamic relations are then extracted by corroborating the temporal properties of the entities involved in the at least one dynamic relation candidate with that of the same entities exhibited in data from a second data source. Then, a dynamic event that gives rise to the dynamic relations among different entities is detected.

21 Claims, 16 Drawing Sheets

(56) References Cited

OTHER PUBLICATIONS

Carneiro, Google Trends, 2009.
Agichtein, E. et al.; "Snowball: Extracting Relations from Large Plain-Text Collections"; In ACM DL, 2000; pp. 1-10.
Banko, M. et al.; "Open Information Extraction From the Web"; In Proceedings of IJCAI-07, 2007; pp. 2670-2676.
Becker, H. et al.; "Learning Similarity Metrics for Event Identification in Social Media"; WSDM; Feb. 2010; pp. 291-300.
Etzioni, 0. et al.; Web-Scale Information Extraction in KnowItAll (Preliminary Results); WWW, May 2004; pp. 1-11.
Freitag, D.; "Information Extraction from HTML: Application of a General Machine Learning Approach"; AAAI/AAI, 1998; pp. 1-7.
Fung, G. et al.; "Parameter Free Bursty Events Detection in Text Streams"; VLDB Conference; 2005; pp. 181-192.
He, 0. et al.; "Analyzing Feature Trajectories for Event Detection"; SIGR, Jul. 2007; pp. 207-214.
Kleinberg, J.; "Burst and Hierarchical Structure in Streams"; Knowledge Discovery and Data Mining; 2002; pp. 1-25.
Leskovec, J. et al.; "Meme-Tracking and the Dynamics of the News Cycle"; SIGKDD, 2009; pp. 1-9.
Pasca, M. et al.; "Organizing and Searching the World Wide Web of Facts—Step One: The One-Million Fact Extraction Challenge"; American Association for Artificial Intelligence; 2006; pp. 1400-1405.
Sakai, T. et al.; "Earthquake Shakes Twitter Users: Real-time Event Detection by Social Sensors"; WWW; Apr. 2010; pp. 1-10.
Sarkas, N. et al.; "Efficient Identification of Coupled Entities in Document Collections"; ICDE, 2010; pp. 769-772.
Tarjan, R. E.; et al.; "Depth-First Search and Linear Graph Algorithms"; SIAM J. Computer; 1, (2) pp. 146-160; 1972.
Turney, P. D.; Mining the Web for Synonyms: PMI-IR Versus LSA on TOEFL; ECML; 2001; pp. 491-502.
Wang, X. et al.; Mining Correlated Bursty Topic Patterns From Coordinated Text Streams; KDD, Aug. 2007; pp. 1-10.
Zhao, 0. et al.; "Temporal and Information Flow Based Event Detection From Social Text Streams"; AAAI; 2007; pp. 1-6.

\* cited by examiner

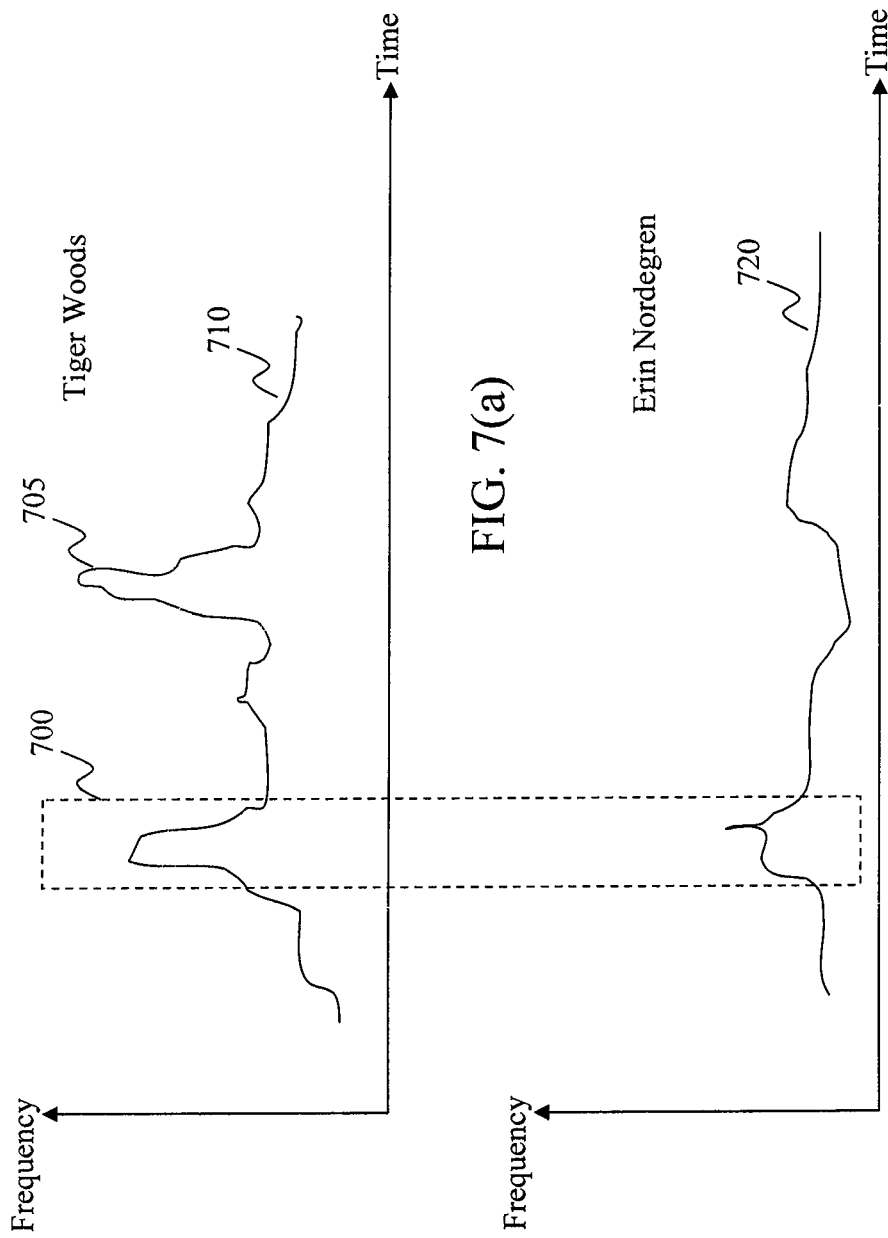

METHOD AND SYSTEM FOR DISCOVERING DYNAMIC RELATIONS AMONG ENTITIES

CROSS-REFERENCE TO RELATED APPLICATIONS

This application is a continuation of U.S. patent application Ser. No. 12/958,151 filed on Dec. 1, 2010, the contents of which are hereby incorporated by reference in their entirety.

BACKGROUND

1. Technical Field

The present teaching relates to methods, systems and programming for identifying dynamic information based on content. Particularly, the present teaching is directed to methods, systems, and programming for identifying dynamic relations among different entities.

2. Discussion of Technical Background

The advancement in the world of the Internet has made it possible to make a tremendous amount of information accessible to users located anywhere in the world. With the explosion of information, new issues have arisen. First, much effort has been put in organizing the vast amount of information to facilitate the search for information in a more effective and systematic manner. Along that line, different techniques have been developed to automatically or semi-automatically categorize content on the internet into different topics and organize them in an, e.g., hierarchical fashion. Imposing organization and structure on content has led to more meaningful search and promoted more targeted commercial activities. For example, by categorizing a piece of content into a class with a designated topic or interest often greatly facilitates the selection of advertisement information that is more on the point and relevant.

Another important issue arising out of the massively available content has to do with how to spot useful information out of massively available content. For example, one may identify a string of events associated with some individual to form a summary of the person's activities in time. As another example, the relationship between entities, whether individuals or business organizations, may also be of interest. To achieve that, content can be analyzed and various types of information can be abstracted through such analysis. Existing approaches to relation extraction have been largely focused on identifying a pre-defined set and/or types of relations or determining statistical associations between instances of predefined attributes. Although useful in certain situations/applications, the conventional approaches are not capable of detecting or discovering relations that emerge dynamically and/or are not a pre-defined type.

In the real world, many relations are formed dynamically over time and often concurrent with the emergence of some events. Such dynamic relations usually can not be pre-defined. For example, the following excerpt reported a piece of news related to some incident:

On Mar. 1, 2009, the U.S. Coast Guard reported that a 21-foot fishing boat was missing off the Gulf Coast near Clearwater Pass, Fla. The boat was reportedly carrying four passengers, including Corey Smith, a former North Carolina State football player, Marquis Cooper, a member of the Oakland Raiders; as well as Nick Schuyler and Will Bleakley, former University of South Florida football players. The search and rescue effort started on March 1 and ended a day later when Schuyler was discovered clinging to the overturned boat and others gone missing. The incident stayed in the national news media for many days because of the victims' connection with the NFL.

The four people mentioned in the above news report are clearly related because of their involvement in the boat incident. However, the conventional approach can not detect the connection among these people because such relations are dynamic or transitory in nature and are not pre-defined. Unfortunately, many relations emerging from daily life or events are dynamic in nature and are not of a pre-defined type. Therefore, there is a need to develop techniques to discover dynamic relations among entities based on accessible information.

SUMMARY

The teachings disclosed herein relate to methods, systems, and programming for content processing. More particularly, the present teaching relates to methods, systems, and programming for discovering dynamic relations among entities.

In one example, a method, implemented on a machine having at least one processor, storage, and a communication platform connected to a network for identifying dynamic relationship and discovering dynamic events is disclosed. Data from a first data source is first received via the communication platform. At least one dynamic relation candidate, each of which involves a plurality of entities, is identified, by a dynamic relation candidate detector, based on temporal properties with respect to the one or more entities exhibited in the data from the first data source. A dynamic relation extractor extracts dynamic relations by corroborating the temporal properties of the entities involved in the at least one dynamic relation candidate with that of the same entities exhibited in data from a second data source. Then, a dynamic event that gives rise to the dynamic relations among different entities is then detected by a dynamic event detector.

In another example, a system for detecting a dynamic relations and discovering a dynamic event is disclosed, which includes a network communication platform connected to a network, through which data from a first data source can be obtained, a dynamic relation candidate detector and a dynamic relation extractor. The dynamic relation candidate detector is configured for identifying at least one dynamic relation candidate, each of which involves a plurality of entities, based on temporal properties with respect to the one or more entities exhibited in the data from the first data source. The dynamic relation extractor is configured for extracting dynamic relations by corroborating the temporal properties of the entities involved in the at least one dynamic relation candidate with that of the same entities exhibited in data from a second data source. The system also includes a dynamic event detector configured for detecting a dynamic event that gives rise to the extracted dynamic relations.

In yet another example, a machine readable non-transitory and tangible medium having information recorded thereon for detecting a dynamic relation and discovering a dynamic event. The recorded information, when read by the machine, causes the machine to perform functions including receiving data from a first data source, identifying at least one dynamic relation candidate, each of which involves a plurality of entities, based on temporal properties with respect to the one or more entities exhibited in the data from the first data source, extracting dynamic relations by corroborating the temporal properties of the entities involved in the at least one dynamic relation candidate with that of the same entities exhibited in data from a second data source; and detecting a dynamic event that gives rise to the dynamic relations among different entities.

Other concepts relate to software for implementing the detection of dynamic relationships and discovering dynamic events. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 7(a) and 7(b) illustrate temporal profiles established based on different entities and the co-peaks of the temporal profiles, according an embodiment of the present teaching;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teaching.

Figure 1:
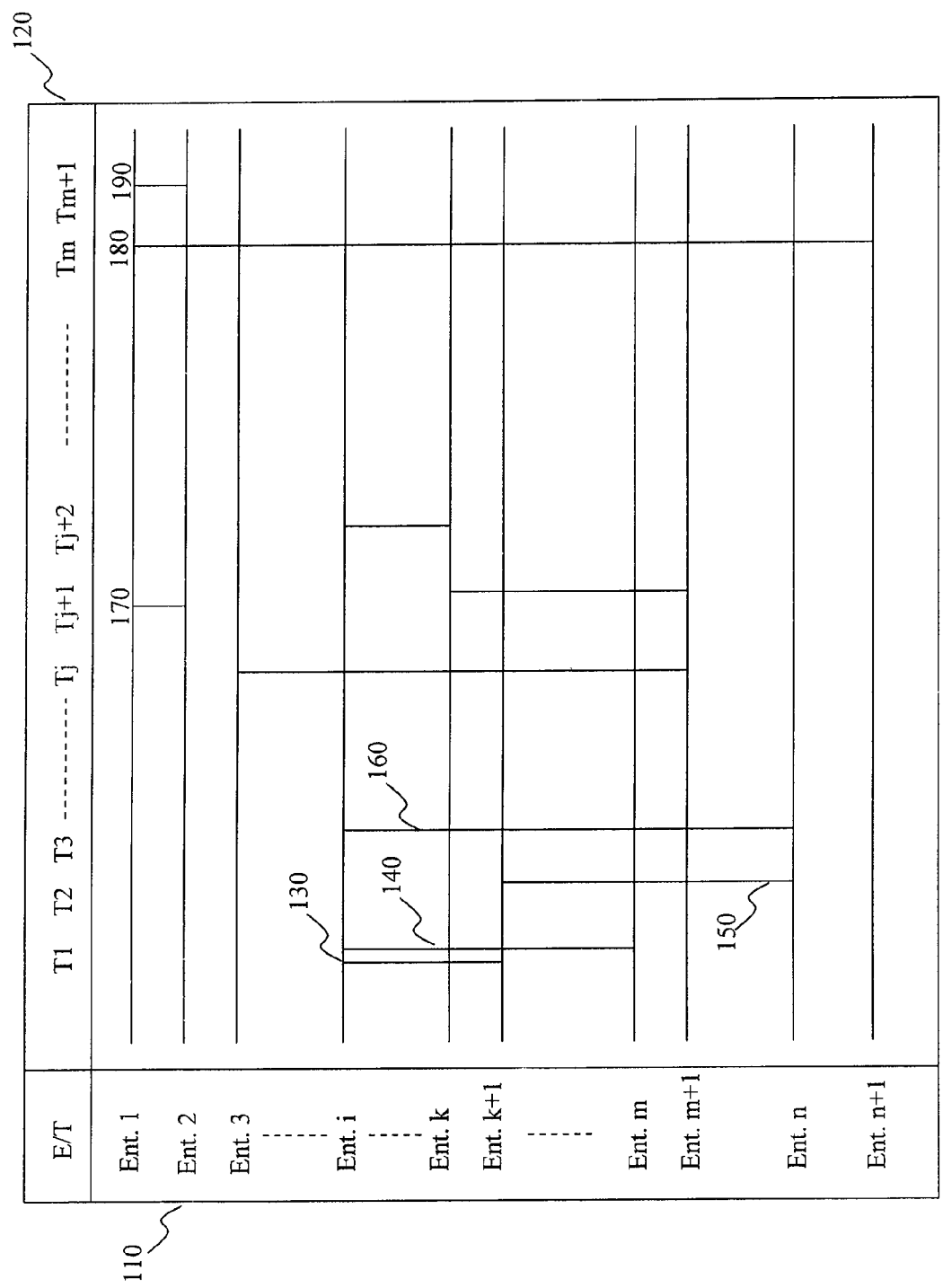
FIG. 1 provides an exemplary depiction of how entities are connected via dynamic relations formed at different times along a time line.

The present teaching relates to discovering dynamic relations among different entities, which can be any identifiable entities such as individuals, organizations, or business units. Information from certain data sources, e.g., unstructured or semi-structured data, sources, is first analyzed to identify dynamically formed connections among different entities. Such connections may be detected, e.g., when such entities are involved in the same event. FIG. 1 is an exemplary depiction of how entities may be dynamically connected at different times along a time line. In this depiction, 110 represents different rows, each of which corresponds to a different entity, Ent. 1, Ent. 2, . . . , Ent. n+1. Columns 120 represent different time instances, each of which can be an hour, a day, a week, etc. Each vertical line, e.g., line 130, connects two entities at a particular time instant. For example, line 130 represents that at time instant T1, entity i and entity k+1 are connected, e.g., both being mentioned in some accessible information. For instance, assume that O. J. Simpson corresponds to entity i, entity m corresponds to his wife Nicole Brown Simpson, and entity k+1 corresponds to Ronald Goldman. If the news stories mentioned that the death of Nicole and Ronald were at the same time in the news reports linking O. J. Simpson to their deaths, there are two connections that can be identified through such news reports. One is the connection between O. J. and Nicole (140) and the other between O. J. and Ronald Goldman (130) at the same time T1. At a later time, say T2, if the news stories mentioned Ronald Goldman's father, say entity n, another connection 150 was developed, linking Ronald Goldman to his father or entity n. Later at time T3, e.g., during O. J.'s trial, Ronald's father or entity n is also connected (via line 160) to O. J. because both names were repeatedly reported in the news about the trial. Because all these events occurred around a continuous period of time, these entities (O. J., Nicole, Ronald, and Ronald's father) are all connected by the same underlying set of events. By detecting such dynamically occurring connections and events, dynamic relations among those entities can also be extracted.

As another example, at time Tj+1, the news report on Tiger Woods' (e.g., entity 1) marriage to Erin Nordegren (entity 2) links Tiger Woods to Erin Nordegren (170). Later in time at Tm, when the news story about Tiger Woods' extramarital relationship with Rachel Uchitel (entity n+1) broke out, Tiger Woods and Rachel Uchitel are connected (180) and during the same time period (Tm+1), the repeated mentioning in the media about the possible divorce between Tiger Woods and his wife Erin Nordegren again links (190) Tiger Woods and Erin Nordegren. Those events connect three entities and by detecting such dynamically occurring connections and events from accessible information, a triangle relationship among Tiger Woods, Erin Nordegren, and Rachel Uchitel can be identified. As can be seen, such dynamic relations, although transient in nature, and the underlying events represent meaningful and useful information.

First, various terms used in this disclosure are defined. A dynamic relation is defined as follows. Given a set of data sources D, and two entities, denoted by e1 and e2, e1 and e2 are dynamically related if the strength of a connection s between e1 and e2 within a time window t exceeds a certain threshold. Such a dynamic relation can be denoted as a 4-tuple (e1, e2, t, s). The intuitive description of an event is the following. Two entities are likely to be dynamically related if they are mentioned more than the usual number of times around the same time. Depending on the data sources, the "more than the usual number of times" may be measured differently. For example, if the data source is query log, it may be measured as bursting (appearing in more than usual number of queried documents) around the same time. If the data source is an archive, it may be measured as appearing together in a large number of documents in a given period of time. Such defined relations are distinct from conventional static and pre-defined relations, which can be extracted from text without additional constraints.

A dynamic event is defined to be a 3-tuple, (E, R, t), where E is a set of entities, R is a set of relationships among the entities in E, and t is a continuous time window. Such an event involves multiple entities who are related by certain dynamic relationships and the event is constrained by a set time window. An event may be the underlying basis for a relationship. For example, the underlying event of the sex scandal is the basis of the dynamic relationship between Tiger Woods and Rachel Uchitel. On the other hand, a relation between different entities may have more than one underlying event. For instance, the relationship between Tiger Woods and Erin Nordegren may be linked to two reported events, one is their marriage and the other is the sex scandal event. Each entity that is involved in an event may have a score indicating the level of involvement of the entity in the event.

Figure 2:
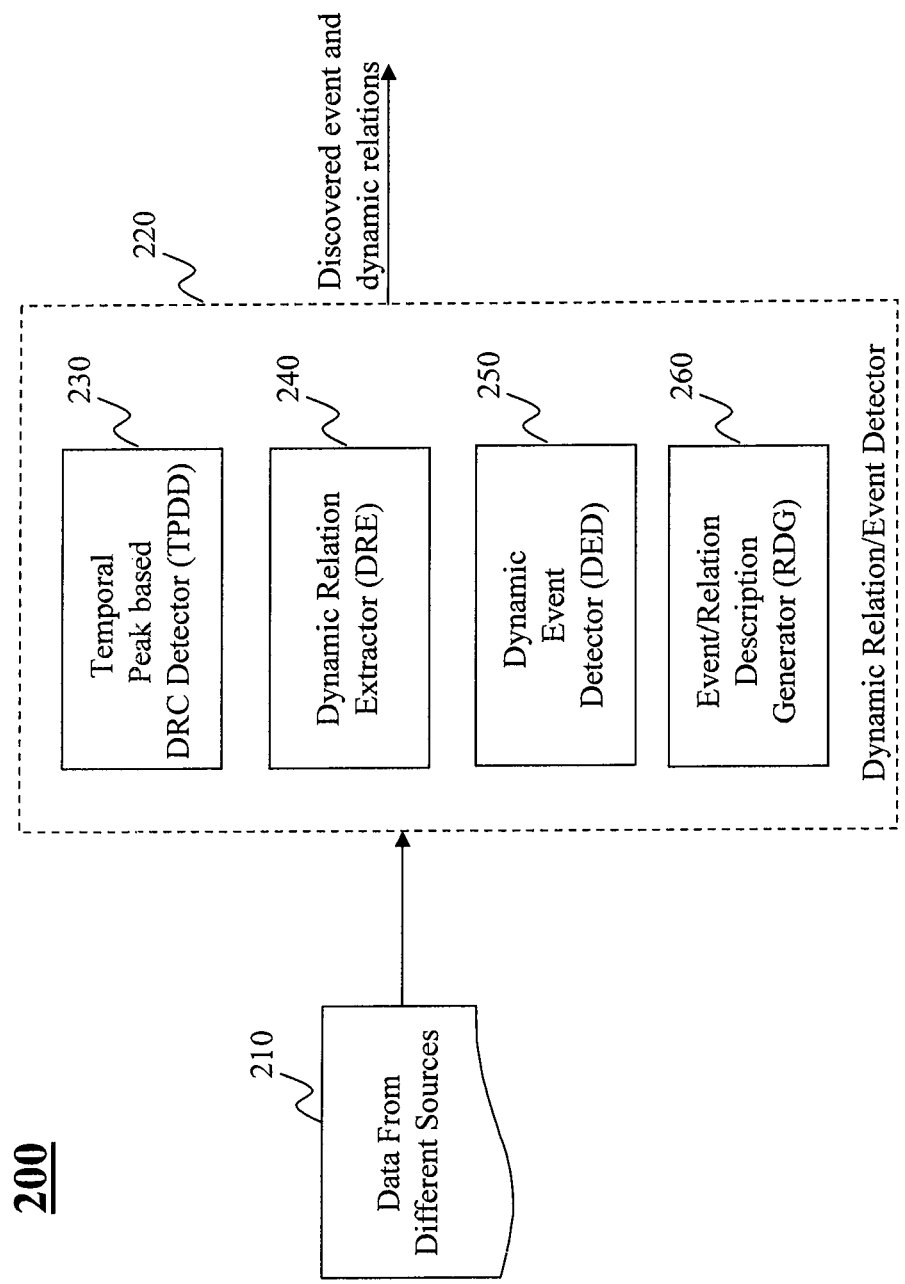
FIG. 2 is a high level depiction of a system for discovering dynamic relations among entities, according to an embodiment of the present teaching.

FIG. 2 is a high level depiction of a system 200 for discovering dynamic relations among entities, according to an embodiment of the present teaching. Data from different sources 210 is input to a dynamic relation detector (DRD) 220, which analyzes the data 220 and derives dynamic relations as its output. To extract dynamic relations, the DRD 220 comprises a temporal peak based dynamic relation candidate detector (TPDD) 230, a dynamic relation extractor (DRE) 240, a dynamic event detector (DED) 250, and a relationship description generator (RDG) 260. When information from different data sources is received, the TPDD 230 analyzes the received information to identify candidate dynamic relations based on co-occurrence of temporal peaks among different entities. Based on the detected dynamic relation candidates, the DRE 240 extracts the discovered dynamic relations. Details relating to TPDD 230 and DRE 240 will be provided with reference to FIGS. 5-7(c). Then the DED 250 detects the events that give rise to the detected dynamic relations. Details relating to detecting events that relate entities are provided with reference to FIGS. 8-11. Such identified underlying events provide a context of the dynamic relations and can be used, by the RDG 260, to generate descriptions of the dynamic relation among entities.

Figure 3:
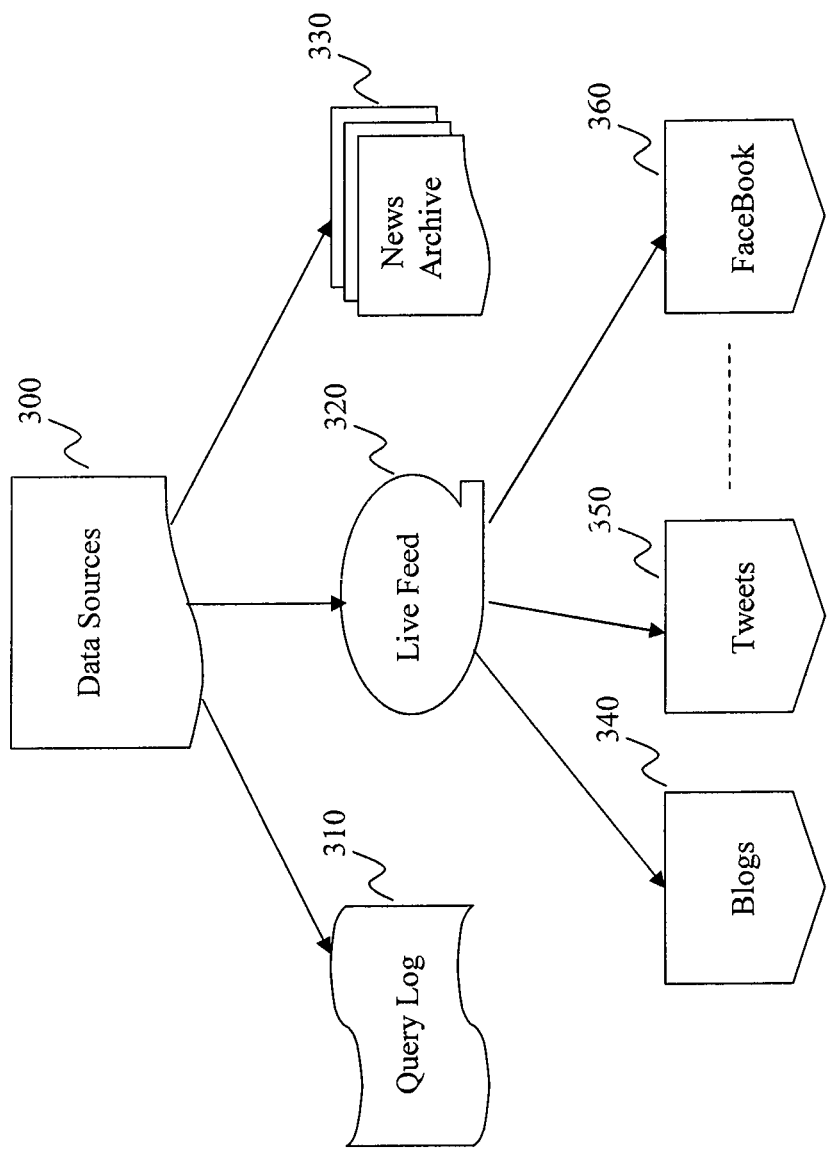
FIG. 3 illustrates exemplary types of data sources.

FIG. 3 illustrates exemplary types of data sources 300, which can be a query log 310, a live feed 320, . . . , or a news archive 330. Each specific type of data sources may have further sub-sources. For instance, the live feed 320 can correspond to blogs 340, tweets 350, . . . or FaceBook 360. Information from different data sources may be accessed or delivered to the DRD 220 (FIG. 2) via network connections (not shown). A network in such a context can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points, through which a data source may connect to the network in order to transmit information via the network.

Figure 4A:
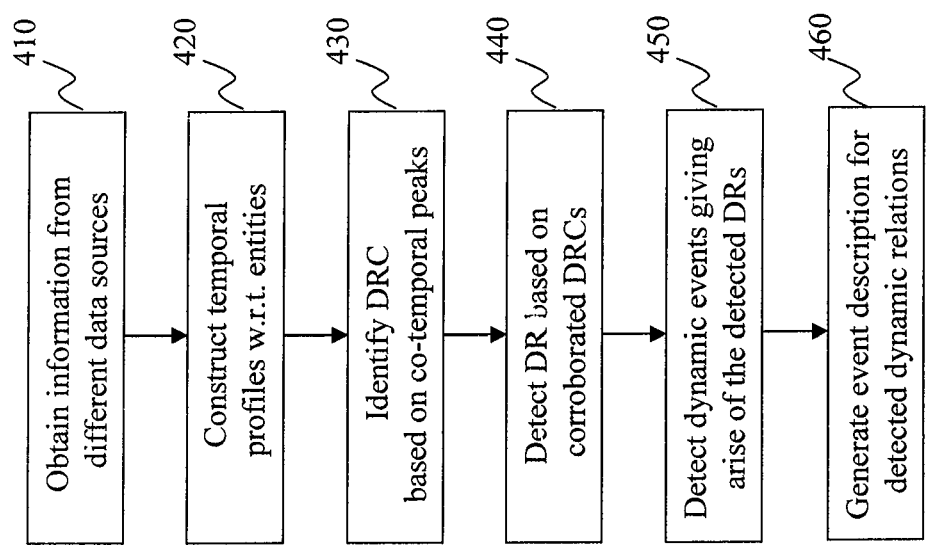
FIG. 4(a) is a flowchart of an exemplary high level process in which dynamic relations among different entities are discovered, according to an embodiment of the present teaching.

FIG. 4(a) is a flowchart of an exemplary high level process in which dynamic relations among different entities are discovered, according to an embodiment of the present teaching. Information from different sources is first obtained at 410. Based on the received information, temporal profiles of entities are computed at 420. In some embodiments, a temporal profile for a particular entity is the number of occurrences of the entity's name within each time unit found in the information from different data sources during a time period. The time unit may be an hour, a day, or a week, which may be dynamically adjusted based on application need. FIGS. 7(a) and 7(b) show two exemplary temporal profiles, 710 and 720, corresponding to entities Tiger Woods and Erin Nordegren, respectively. In these examples, the x-axis is time and the y-axis represents the frequency or number of occurrences within a time unit. It can be seen that a temporal profile of a particular individual with respect to a particular time period indicates how intensely this individual is being reported in the media.

Based on the temporal profiles of different entities, the TPDD 230 detects, at 430, dynamic relation candidates by, e.g., identifying entities that co-peak in the same time period. For example, in FIGS. 7(a) and 7(b), both temporal profiles of Tiger Woods 710 and Erin Nordegren 720 peak during the same time unit 700. The fact that the media mentions both during the same time period may be an indication that these two people are related during that period by some underlying event(s). For instance, the peaks during time period 700 may correspond to the event, e.g., of their marriage. At time unit 705, there is another peak in the temporal profile 710 for Tiger Woods but there is no corresponding counterpart peak in the temporal profile 720 for Erin Nordegren. For instance, at time unit 705, Tiger Woods may be mentioned by the media for his winning a golf tournament, which is why it is not related to Erin Nordegren. In this case, the co-occurrence of peaks in temporal profiles 710 and 720 may lead to a detection of a candidate dynamic relation between Tiger Woods and Erin Nordegren. The selection of the time unit may be used to constrain the temporal nature of dynamic relations to be detected. For instance, the time unit may be set to be a certain time window so that the relation detected may be directed to ones that are driven by some emerging underlying events. It is understood that identifying dynamic relationship candidates via the co-peaking technique is for illustration only. Any other approaches that are designed to identify two entities likely being involved in the same underlying event during a time window may be adopted to detect candidate dynamic relations.

It is not always the case that peaking at the same time means that the co-peaking entities are dynamically related. At 440 of the flow, the dynamic relationship candidates, detected at 430, are further filtered based on corroboration, as discussed herein. If a temporal profile is constructed using bursting measures computed from a query log and candidate dynamic relationships are estimated by detecting the co-peaking entity pairs, it is possible that two co-peaking entities, while both peaked very high on the same day, are actually not related by any event. For example, on the same day, there may be many documents in query logs related to Tiger Woods and President Obama, respectively, due to, e.g., the fact that Tiger Woods' sex scandal was just being exposed and President Obama just gave a speech that stirred up much criticism. These two entities, Tiger Woods and President Obama, are not related despite the fact that they co-peaked in the temporal profile constructed based on the query log. To reliably detect dynamic relations, in some embodiments, information from different sources, e.g., a news archive, may be used as part of dynamic relationship detection to see whether the co-peaking observed from one data source (e.g., query log) can be corroborated in another independent data set. For instance, information from a news archive may be used to see whether in the news, these two entities are actually mentioned in the same documents. Intuitively, if they are also mentioned in the same documents, likely they are involved in the same underlying event. Otherwise, the co-peaking phenomenon may be simply coincidental. For instance, although both Tiger Woods and President Obama co-peaked in the query log, it is very unlikely that their names appear in the same documents from a news archive. In this way, any incidental co-peaking entities may be filtered out from dynamic relationship candidates. On the other hand, if the co-peaking observation based on one data set (e.g., query log) is corroborated in another data set based on co-appearance in the same document, it can be confirmed that the originally detected candidate dynamic relation is likely an actual dynamic relationship.

Figure 4B:
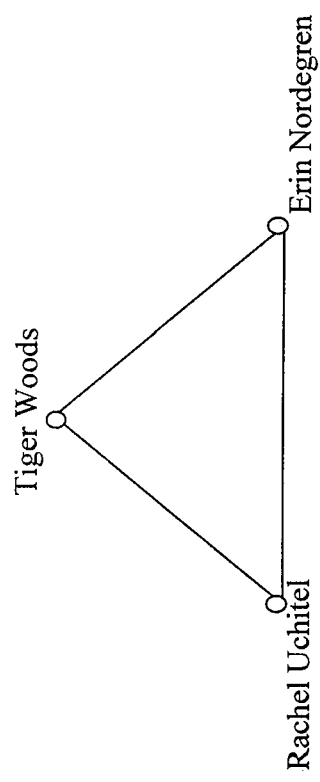
FIG. 4(b) illustrates a graph representation of a three-way relationship.

Based on such detected dynamic relations, events that give rise to the dynamic relationships are detected at 450. For example, if both the dynamic relationship between Tiger Woods and Rachel Uchitel and that between Tiger Woods and Erin Nordegren are detected, the underlying event, the Tiger Woods' sex scandal, that gives rise to both dynamic relationships can be detected. Based on this underlying event, the two originally detected dynamic relationships (between Tiger Woods and Rachel Uchitel and between Tiger Woods and Erin Nordegren) are now merged into one 3-way relationship among Tiger Woods, Rachel Uchitel, and Erin Nordegren. This is illustrated in FIG. 4(b). Based on the detected event, information surrounding the event or entities participating or involved in the event (e.g., from news articles or online documents describing the event or any other information about the dynamically related entities involved in the event) may be used to generate, at 460, a characterization of the event.

Figure 4C:
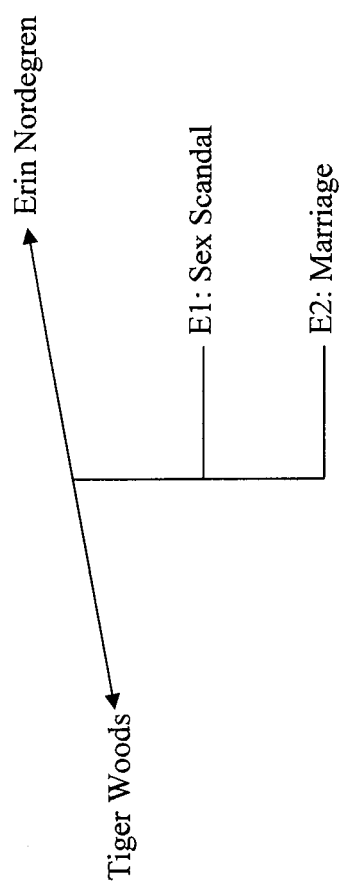
FIG. 4(c) shows a relationship between two entities that has multiple events associating the entities.

Such a description may include a set of attributes, some of which may be a textual characterization of the event(s) (e.g., a summary) or any entity involved in the event, some of which may correspond to a measure, either qualitative or quantitative. For instance, a measure may be included to indicate, e.g., the confidence in the detected event, which may be computed as, e.g., the strength of the dynamic relationships existing among the entities involved in the same event. As another example, it can be a measure of the likelihood of the set of all participating entities being dynamically connected during a particular time interval. In addition, a description may also include other useful links that may be used to access other relevant information. In some embodiments, the description may also include a list of additional static relationships that exist among different entities who are involved in the current detected dynamic relationship. For example, in the triangle relationship among Tiger Woods, Rachel Uchitel, and Erin Nordegren, there may be another already existing static relationship such as the marital relationship between Tiger Woods and Erin Nordegren. In this case, Tiger Woods and Erin Nordegren are related by not only the sex scandal event but also by the marriage event, as shown in FIG. 4(c). Such information may be utilized to enrich the descriptive power of the currently detected event.

Figure 5A:
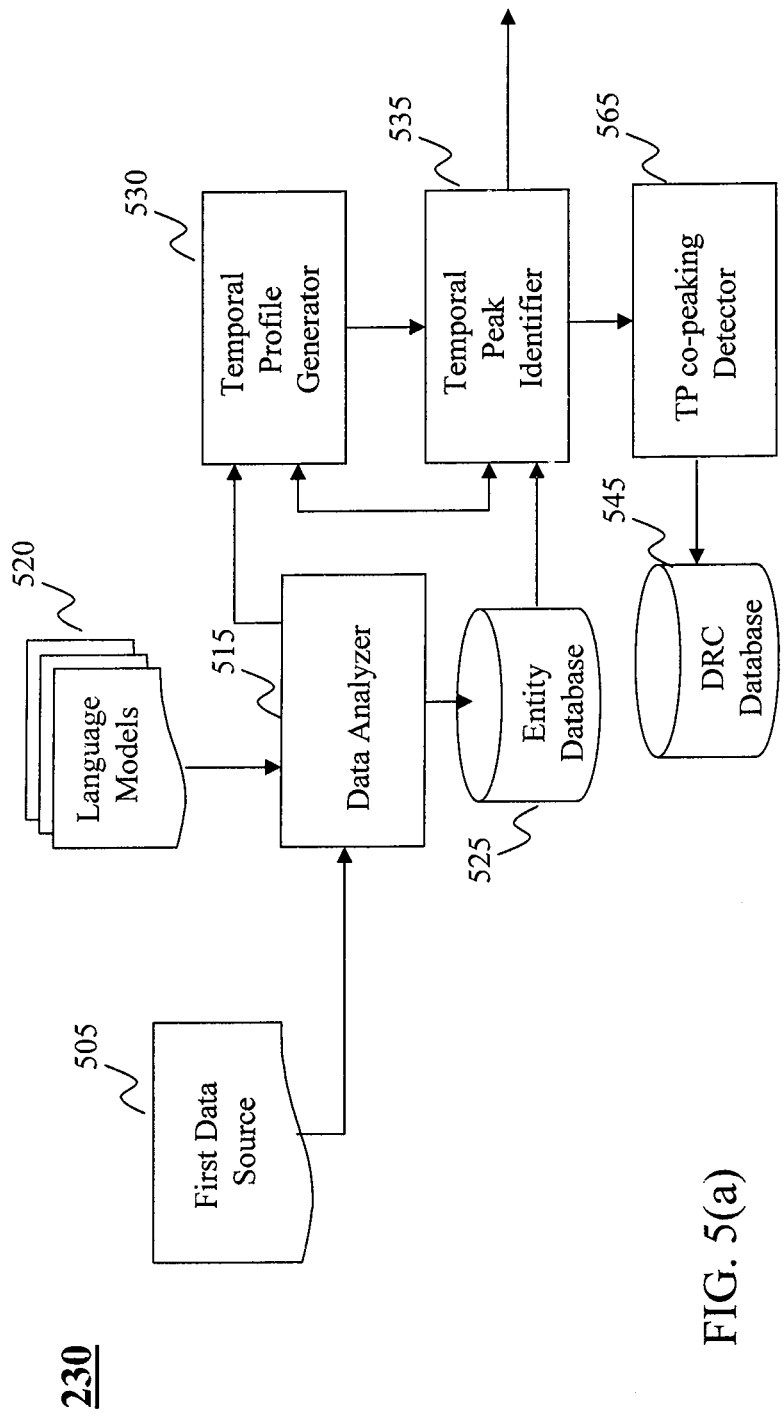
FIG. 5(a) depicts an exemplary system diagram for a temporal peak based dynamic relation candidate detector (TPDD), according to an embodiment of the present teaching.

FIG. 5(a) depicts an exemplary system diagram for the temporal peak based dynamic relation candidate detector (TPDD) 230, according to an embodiment of the present teaching. Information from a first data source 505 is first received by a data analyzer 515. Such information is analyzed by the data analyzer 515 to, e.g., extract entities based on any existing technologies. For instance, by employing some of the existing technologies to extract entities, language models 520 may be utilized. The extracted entities may be stored in an entity database 525. In some embodiments, the entities may be extracted by a third party provider. In this case, the data analyzer 515 may directly proceed to other processing.

Based on the extracted entities and the information from the first data source, the data analyzer 515 may process the content from the first data source in which different entities appear. For example, the data analyzer 515 may compute the frequency of the occurrences of every entity with respect to the content from the first data source 505. Such frequency may be computed based on a certain unit of time, e.g., each day or each week. The frequency information may be forwarded to a temporal profile generator 530, which may then construct, for each entity, a temporal profile with respect to time based on the frequencies of occurrences of the entity in content from the first data source 505.

An example temporal profile produced by the temporal profile generator 530 is illustrated in FIG. 7(a), which is an exemplary temporal profile for Tiger Woods within a certain period of time. As can be seen in FIG. 7(a), the frequency of occurrences of Tiger Woods in different media content fluctuates over time. That is, in some time periods, his name may appear much more than usual, e.g., when his sex scandal was reported in the media. FIG. 7(b) shows another example temporal profile for, e.g., Tiger Woods' wife Erin Nordegren. As can be seen, although there are fluctuations, the amplitude of the fluctuation for Erin Nordegren is lower than that of Tiger Woods. In general, a peak in a temporal profile for an entity represents that the entity is likely widely mentioned in the media and it may serve as an indication that there is some underlying event occurred involving the entity.

In most situations, when two entities are related by an underlying event, when such event is reported in the media, names of both entities usually co-occur in a single document. This observation also indicates that the temporal profiles for two entities who are related by the same underlying event usually have peaks in their temporal profiles during the same time period. Based on such observations, in order to detect dynamic relations among different entities, peaks of temporal profiles and co-peaks between different temporal profiles may be identified. However, it is not true that when two entities have temporal profile peaks during the same time period they are necessarily related. For instance, during the time period that Tiger Woods' sex scandal broke to the media, President Obama may be widely reported on his effort to pass the health care bill in the House. Although their temporal profiles may have peaks during the same period, Tiger Woods and President Obama are not related by the same underlying event and therefore, are not dynamically related.

The temporal profile generator 530 generates temporal profiles for all entities being analyzed. Such temporal profiles are sent to a temporal peak identifier 535, where peak locations in time in each temporal profile can be identified. For instance, in FIG. 7(a), peaks 700 and 705 in two different time periods in Tiger Woods' temporal profile are identified. To detect peaks in temporal profiles, different techniques may be employed. In some embodiments of the present teaching, a rapid rising approach may be used to detect peaks. The former detects a peak by relying on a rapidly rising edge and the latter detects a peak by relying on both a rapidly rising edge and a rapidly falling edge in a temporal profile. For instance, let's assume that a temporal profile is Te, t is a time window with a certain duration, e.g., a day, and Ct is a count which is the number of occurrences within time window t. To detect a peak using the rapid rising approach, time window t corresponds to a rising edge of a peak if Ct is more than 1 standard deviations away from the mean count of k leading time windows. That is, there is a sharp rise in the temporal profile. Alternatively, to detect a peak using rapid rise and fall approach, each Ct is compared with the mean count of k leading windows and the mean count of k tailing windows. If Ct is over 1 standard deviations away from the mean count of the k leading windows, a rising edge is detected at window t. If Ct is over 1 standard deviations away from the mean count of the 1 tailing windows, a falling edge is detected at window t. Such peaks usually can capture most of the dynamic events that exhibit short-spiking behavior in terms of duration.

If no peak is detected from a temporal profile, the entity corresponding to the temporal profile may be removed from further processing. Any remaining temporal profiles for which peaks have been identified may then be sent to a temporal profile (TP) co-peaking detector 565, where any two entities that have peaks in their temporal profiles during the same time unit may be identified. Such pairs of entities may then be stored in a dynamic relation candidate (DRC) database 545 for further verification and processing.

Figure 5B:
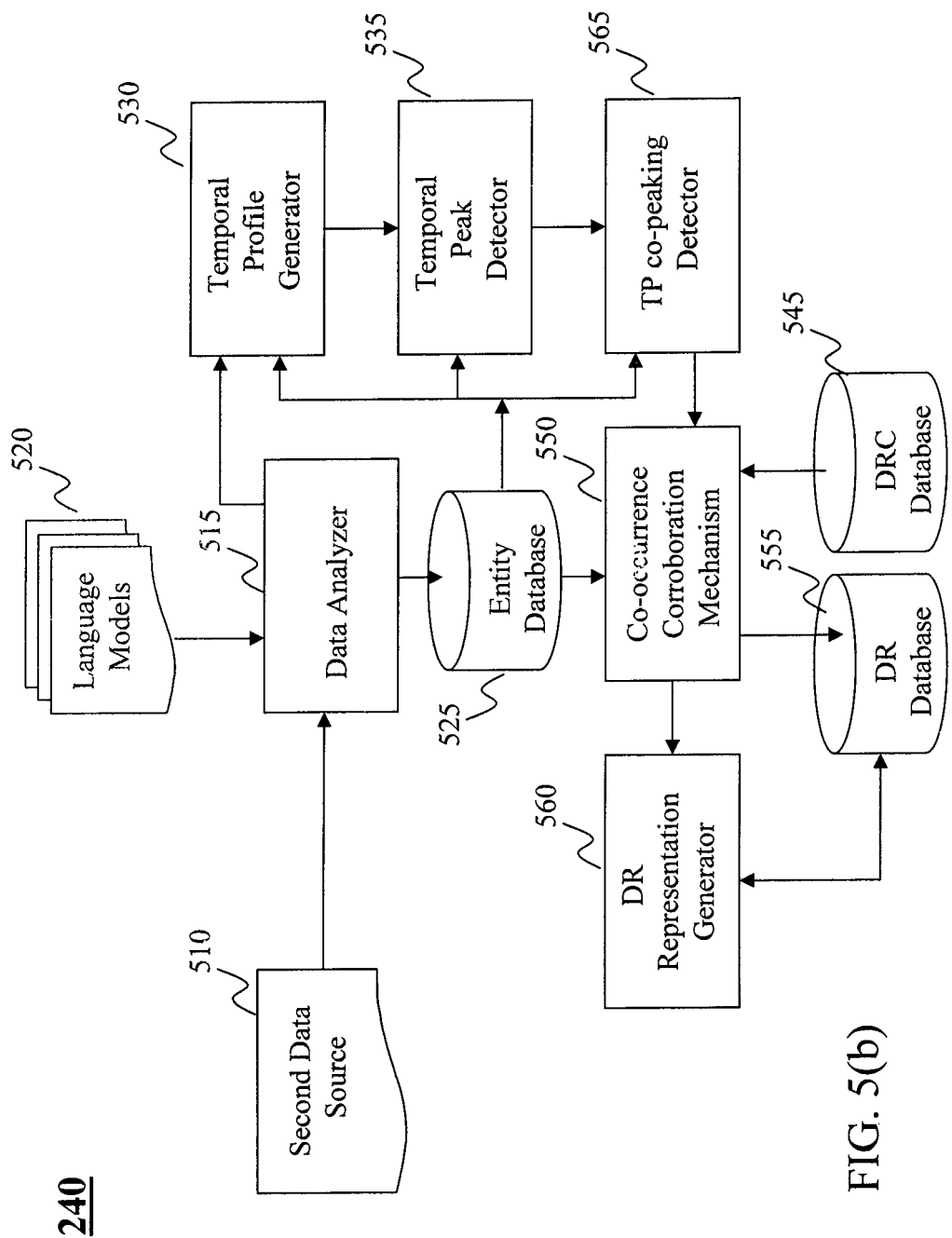
FIG. 5(b) depicts an exemplary system diagram for a dynamic relation extractor (DRE), according to an embodiment of the present teaching.

FIG. 5(b) depicts an exemplary system diagram for the dynamic relation extractor (DRE) 240, according to an embodiment of the present teaching. The DRE 240 takes the dynamic relation candidates stored in the DRC database 545 as input and identifies dynamic relations by confirming or verifying whether any two entities in a DRC candidate is related with some level of certainty. In some embodiments, to verify a detected dynamic relation candidate, the DRE 240 analyzes information from other data sources that are disjoint from the first data source to ascertain whether the two entities involved in a dynamic relation candidate also have co-peaks in their temporal profiles constructed based on the other data sources. For instance, if Tiger Woods and President Obama co-peaked in the content from the first data source 505, which is, e.g., a query log, the DRE 240 may analyze content from other sources, e.g., content from the Internet or specific web sites, to see whether these two entities also co-peak in content from independent sources.

In some embodiments, the DRE 240 obtains content from a second data source 510 and identifies entities. In some situations, it may identify only the entities involved in the dynamic relation candidates stored. In some embodiments, the DRE 240 may rely on the entities stored in the entity database 525 as the basis for identifying the occurrences of those entities involved in the dynamic relation candidates in the DRC database 545 (not shown) [QIAN, 545 IS SHOWN]. The frequencies of occurrences of entities in content from the second data source 510 may then be sent to the temporal profile generator 530 so that temporal profiles for entities that occurred in content from the second data source 510 may be constructed. The constructed temporal profiles are then sent to the temporal peak detector 535 so that various peaks in the temporal profiles obtained based on content from the second data source 510 may be detected by the temporal peak detector 535. Similar to the manner in which the content from the first data source 505 is further processed, the TP co-peaking detector 565 then identifies all entities from the second data source 510 that have co-peaks in their respective temporal profiles during the same time period.

Entity pairs that have co-peaks detected from temporal profiles derived based on content from the first data source 505, determined based on the dynamic relation candidates (stored in DRC database 545) may then be checked against the co-peaking entities identified based on the content from the second data source 510. This is done by a co-occurrence corroboration mechanism 550, which takes the co-peaking pairs from both the first data source and the second data source and determines whether corroboration can be found. If two entities are co-peaked in content from both data sources, there may be a higher degree of certainty that the two entities are indeed dynamically related. In this case, the two entities may be treated as parties related by a dynamic relation and may then be stored in a dynamic relation (DR) database 555. If corroboration of co-peaking between two entities identified based on content from the first data source 505 can not be found in the temporal profiles obtained based on content from the second data source 510, the initially identified dynamic relation candidate then is not selected as a detected dynamic relation.

Figure 7C:
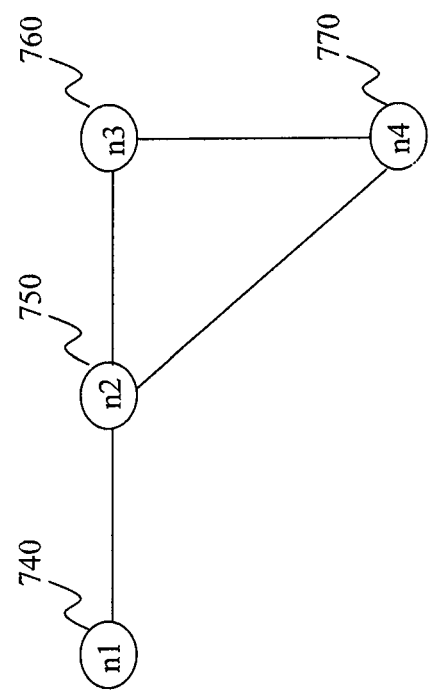
FIG. 7(c) illustrates an exemplary representation of dynamic relations detected among different entities.

Once all the dynamic relations are identified (e.g., stored in the DR database 555), a dynamic relation (DR) representation generator 560 may then produce a representation for each such identified dynamic relation. For instance, a representation of a dynamic relation may correspond to a graph, in which nodes of the graph represent entities involved in a dynamic relation and a link between two entities may represent a dynamic relationship between the two. Such generated representation may then be stored in the DR database 555. An example of a representation of a dynamic relation is shown in FIG. 7(c). In this example, there are four entities and different pairs of two entities are linked by some dynamic relationship detected. For instance, node 1 740 is linked to node 2 750, node 750 is also linked to node 3 760 and node 4 770, and node 3 760 is also linked to node 4 770. In this graph representation, even though there are links connecting to a pair of entities, it may not be necessary that each dynamic relation involves only a pair of two entities.

For example, three entities may be involved in a triangle relationship such as Tiger Woods, Eric Nordegren, and Rachel Uchitel.

To provide adequate information in a representation of a detected dynamic relation, various attributes associated with either an entity or the nature of the relationship may be identified and used to generate a representation of the dynamic relation. For instance, for each node, different attributes describing the entity (e.g., name, sex, age, profession, or past media reported events involving the same entity) may be associated with each node. For each link connecting two entities, attributes may also be used to describe the properties of the link, e.g., the time frame during which co-peaking leads to the connection or a summary of the media report, e.g., in the form of keywords, that may provide information as to the nature of the relationship. In addition, each edge in the graph may be weighted by a measure that may indicate the strength of the connection between the two entities. For example, this measure may be computed based on the amplitude of the peaks that occurred during the same time period. In this manner, the representation of the detected dynamic relation not only reflects how the entities are connected but also some details about different aspects of the dynamic relation. In some embodiments, the DR representation generator 560 may generate some description of the dynamic relation such as information related to the entities involved in the relationship and some snapshot of what is being reported about the relationship between the entities. Such information may be further utilized in subsequent processing steps, e.g., after the event that gives rise to the dynamic relationship is identified, to provide a more detailed and precise description of the dynamic relationships. Detailed discussion related to detecting such events is provided with reference to FIGS. 8-12.

In the exemplary embodiment of the DRE 240, as shown in FIG. 5(*b*), it may invoke the system components that are shared with the TPDD 230 (see FIG. 5(*a*)). For example, the data analyzer 515, the temporal profile generator 530, the temporal peak detector 535, and the TP co-peaking detector 565 may be shared by both the TPDD 230 and DRE 240. It is understood that the presented implementation is merely for illustration rather than for limitation. Any implementation that may be adopted to identify dynamic relation candidates via temporal profile co-peaking and co-corroboration are within the spirit of the teaching discussed herein.

Figure 6:
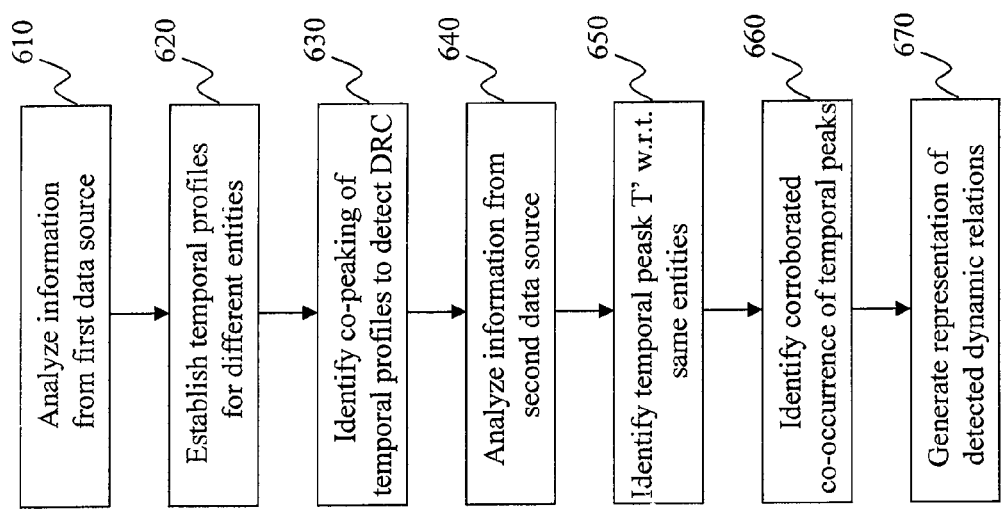
FIG. 6 is a flow chart of a process, in which dynamic relations are detected based on content from different data sources, according to an embodiment of the present teaching.

FIG. 6 is a flow chart of a process, in which dynamic relations are detected based on content from different data sources, according to an embodiment of the present teaching. Information obtained from a first data source is analyzed at 610. Temporal profiles with respect to different entities are then constructed at 620. Based on the temporal profiles, co-peaking entities are identified, at 630, and such co-peaking entities are stored as dynamic relation candidates. To verify whether co-peaked entities are linked by a dynamic relation with some certainty, content from a second independent data source is obtained and analyzed at 640. Temporal profiles are derived based on the content from the second independent data source and peaks in such temporal profiles are also identified at 650. Co-peaks from temporal profiles obtained from both the first data source and the independent second data source are checked, at 660, to see whether each co-peak from the first data source is corroborated by a co-peak identified from the second independent data source. If it is corroborated, the corresponding dynamic relation candidate determined based on the first data source is identified as a detected dynamic relation. A representation for the detected dynamic relations is then generated at 670.

As discussed herein, each detected dynamic relation, which may involve more than two entities, is usually given rise by some underlying event that occurred. For example, the dynamic relation among Tiger Woods, Erin Nordegren, and Rachel Uchitel is dominated by Tiger Woods' sex scandal. Although the representation obtained so far for the detected dynamic relations provides information about who is linked to whom, it does not indicate how the entities in the representation are to be divided in accordance with the underlying events that gave rise to the different dynamic relations. As one example, the graph representation as shown in FIG. 7(*c*) may include more than one dynamic relation. For instance, nodes 2, 3, and 4 (750, 760, and 770, respectively) may correspond to Tiger Woods, Erin Nordegren, and Rachel Uchitel, respectively. The triangle among these three may correspond to the underlying event of the sex scandal. In this example, although node 1 740 (e.g., corresponding to a Tiger Woods' competitor, to whom Tiger Woods just lost a game on the golf course) is linked to node 2 750 (e.g., Tiger Woods), their relationship has nothing to do with the sex scandal. That is, in this representation, although all entities are linked together, there are multiple underlying events that give rise to different dynamic relations. Therefore, to precisely detect each dynamic relation, the underlying event that gave rise to each dynamic relation also needs to be accurately detected.

Figure 8:
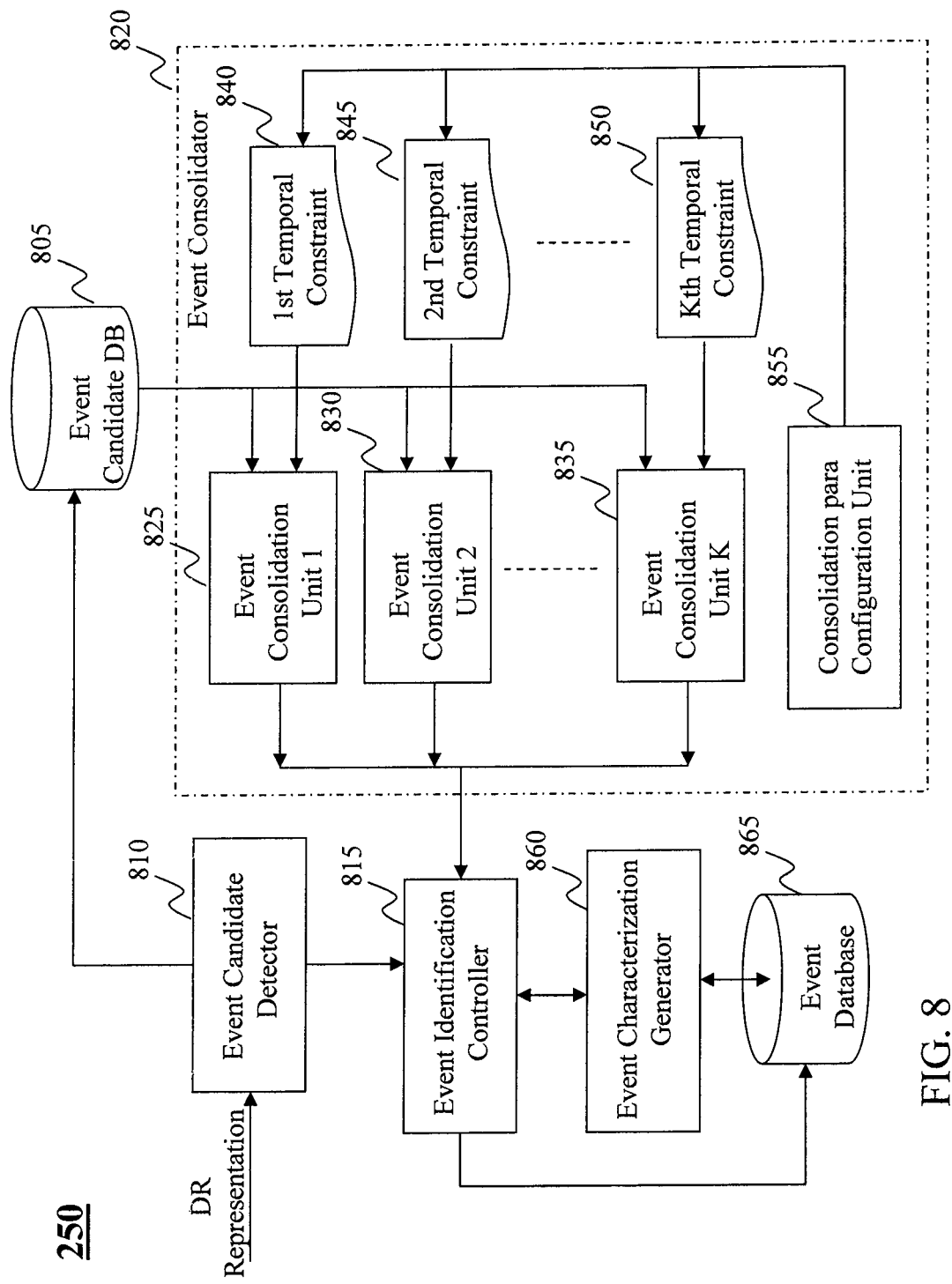
FIG. 8 depicts an exemplary system diagram of a dynamic event detector (DED) according to an embodiment of the present teaching.

FIG. 8 depicts and exemplary system diagram of the dynamic event detector (DED) 250 according to an embodiment of the present teaching. In this exemplary embodiment, dynamic events are detected as holistic dynamic events based on the dynamic relationships that have so far been identified by combining multiple binary relationships and the entities involved in those relationships, so long as they are temporally consistent, into a single n-way event that represents a real world event. In some embodiments, detection of such holistic real world events can be achieved in three stages. The first stage is to detect dynamic event candidates, the second stage is to consolidate the dynamic events based on some criteria that enforce temporal consistency, and the third stage is to estimate the likelihood as to how likely the consolidated event is a true real world event.

In the exemplary system diagram of the DED 250, an event candidate detector 810 is designed to achieve the first stage of processing to detect pairwise dynamic relationships. The event candidate detector 810 takes the dynamic relationship (DR) representation from the DR database 555 as input. As discussed herein, in some embodiments, the DR representation corresponds to graphs, in which nodes represent entities and an edge represents a detected dynamic relation linking two entities involved in the dynamic relationship. From such a DR representation, the event candidate detector 810 identifies pairwise temporal graphs, each of which may have multiple nodes and multiple edges. FIG. 7(*c*) illustrates one example of a pairwise temporal graph, in which there are multiple nodes, representing multiple entities, and multiple dynamic relationships, each of which is represented by an edge in the graph. However, from this example, it is not clear yet as to whether all the entities and dynamic relationships represented in the graph are actually all linked by the same real world event.

An actual dynamic relationship among different entities has the same underlying event so that it is necessary to detect the underlying event that gives rise to a meaningful dynamic relationship. To do so, in the second stage, a pairwise temporal graph, identified by the event candidate detector 810, is further processed by an event consolidator 820 to identify the nodes and edges in each pairwise temporal graph that correspond to the same real world event. To achieve that, the event consolidator 820 applies one or more temporal constraints, which can be dynamically configured by a consolidation parameter configuration unit 855, to the pairwise temporal graph being processed to estimate which nodes and edge(s) therein should be merged or consolidated into one single event. In some embodiments, the event unit 1 825, event consolidation unit 2 830, . . . , event consolidation unit K 835, each of which may be responsible for enforcing one or a sub-set of temporal constraints, e.g., a first temporal constraint 840 may be used by event consolidation unit 1 825 to consolidate pairwise relationships, a second temporal constraint 845 may be used by event consolidation unit 2 830 to consolidate pairwise relationships, . . . and a Kth temporal constraint 845 may be used by event consolidation unit K 835 to consolidate pairwise relationships. In processing, an event identification controller 815 may control what temporal constraint is to be used in consolidating the pairwise temporal graphs by selectively invoking appropriate event consolidation units.

Each event consolidation unit may be configured to apply certain temporal constraint(s) to a given pairwise temporal graph. Application of each temporal constraint may yield a different result, i.e., a different sub-graph or a clique of the pairwise temporal graph. In some embodiments, operations of different event consolidation units may be performed sequentially. A result from an event consolidation unit, together with, e.g., the original pairwise temporal graph, may be passed to a next event consolidation unit and the last event consolidation unit K may produce the ultimate result. In some embodiments, results from different event consolidation units may all be passed to the event identification controller 815 so that they can be merged to produce a final result of a consolidated event that link different entities and the dynamic relationships among the linked entities are all related to a single real world event.

Different temporal constraints may be configured and used m consolidating events. Exemplary temporal constraints include a global temporal constraint and local temporal constraint. Based on the observation that any real world event may be reported over a certain length of time, e.g., a few weeks, a global temporal constraint aims at limiting the time span associated with edges of a pairwise temporal graph within that certain length of time. For instance, a specific global temporal constraint may be that all the nodes and edges in a graph cliqued from the pairwise temporal graph are not separated by more than K weeks. For the special case where K is zero, every edge in a pairwise temporal graph has a time frame attribute within the same week so that events found in this fashion are on a week-by-week basis.

Such a global temporal constraint caps the maximal span of the event and sometimes may not be adequate to identify reliably a coherent real world event. For instance, if there are two events that occurred back to back within K weeks, even though the pairwise temporal graph may meet the global temporal constraints, there are two underlying events being consolidated into one event. To improve the performance of event consolidation, other temporal constraints may also be used. A local temporal constraint focuses more on the temporal continuity among dynamic relationships. Given an event, if there is an entity that connects two different entities during two close time periods, then the three entities are more likely to be actually related as a result of the event if the two time periods overlap. Another observation is that an event spanning a period may be more likely to be an actual event if each of the consecutive weeks in the period is supported by some dynamic relationships. To reflect such observations in consolidating an event, a local temporal constraint may be designed to require that any two dynamic relationships involving the same entity should share a common time period, such as one week, and those dynamic relationships should also together form a continuous time period and each dynamic relationship should also be covered by this overall time period.

Figure 11C:
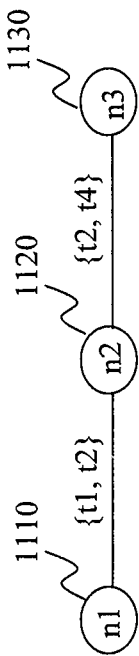
FIGS. 11(b)-(c) illustrate examples of consolidated events based on local temporal constraints, according to an embodiment of the present teaching.
Figure 11B:
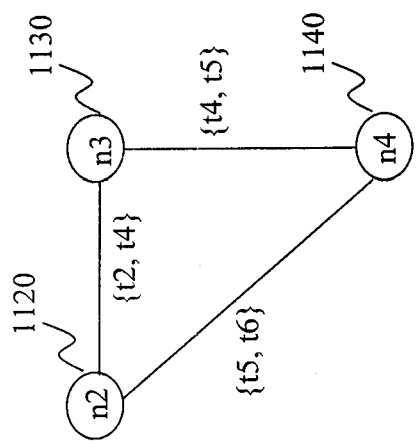
Figure 11A:
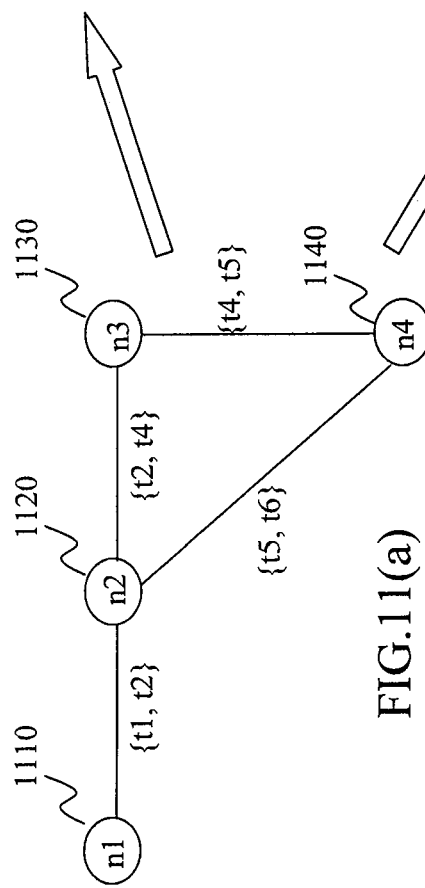
FIG. 11(a) shows a pairwise temporal graph representing detected dynamic relations.

FIGS. 11(b)-(c) illustrate examples of consolidated events based on local temporal constraints as discussed herein based on a pairwise temporal graph as shown in FIG. 11(a). As can be seen in FIG. 11(a), there are four nodes 1110, 1120, 1130, and 1140 and four edges marked by time periods {t1,t2}, {t2,t4}, {t4,t5}, and {t5,t6}. That is, entities 1110 and 1120 are linked by a relationship that occurred during time period {t1, t2}, entities 1120 and 1130 are linked by a relationship that occurred during time period {t2, t4}, entities 1130 and 1140 are linked by a relationship that occurred during time period {t4, t5}, and entities 1120 and 1140 are linked by a relationship that occurred during time period {t5, t6}. By enforcing the local temporal constraint as described above, the pairwise temporal graph shown in FIG. 11(a) is divided into two cliques or sub-graphs, as shown in FIGS. 11(b) and 11(c), both of which have entities that link to other entities and share a common time period. For instance, in the first sub-graph in FIG. 11(b), node 1130 links to two nodes 1120 and 1140 and on these two links, the shared time is t4. Similarly, in FIG. 11(c), node 1120 links to two other nodes 1110, and 1130 and the shared time is t2.

Figure 12:
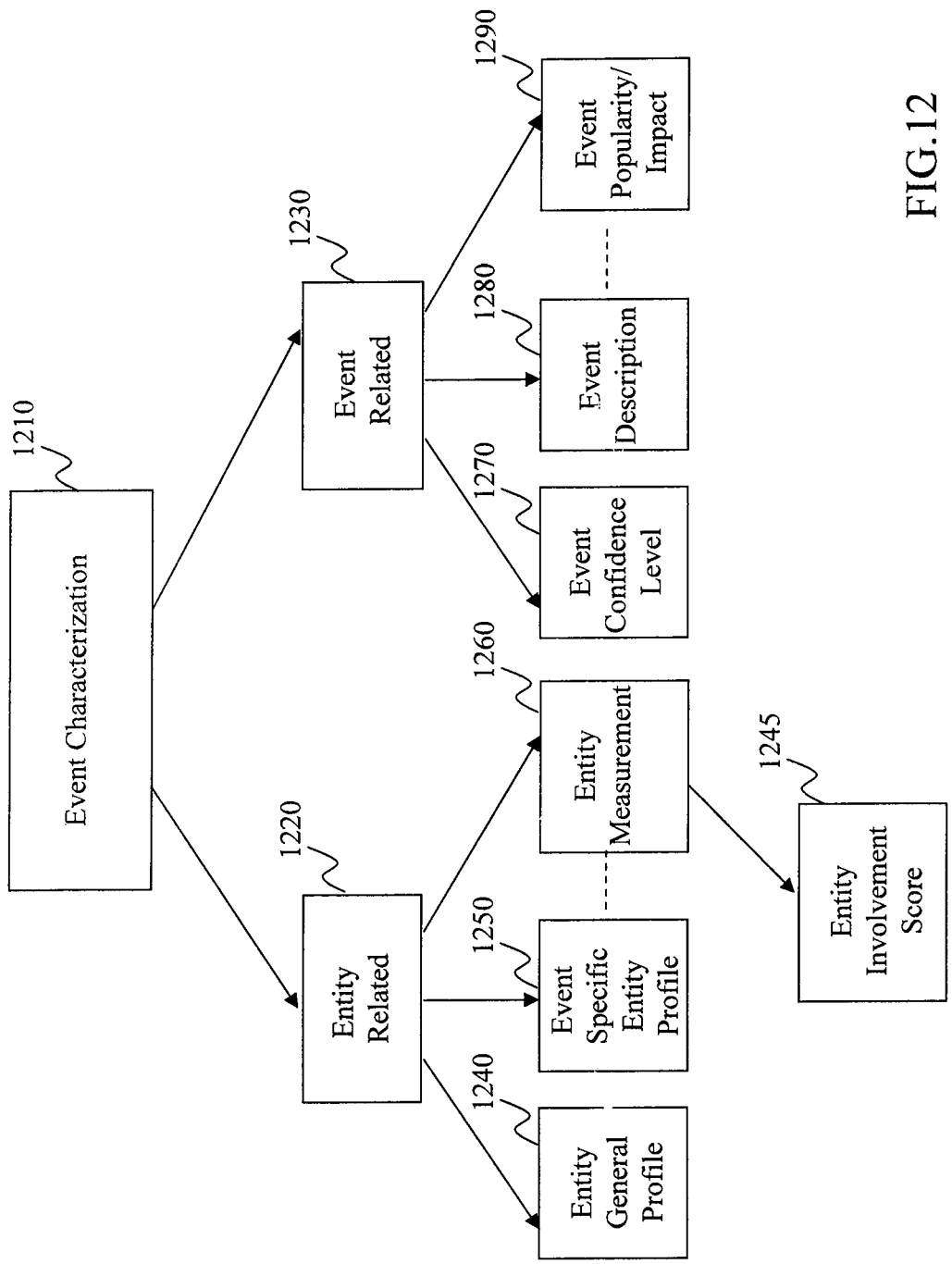
FIG. 12 illustrates exemplary types of event characterization.

Such consolidated events, each of which is represented by a clique or a sub-graph, may then be stored in an event database 865. Each consolidated event and information associated therewith may also be sent to an event characterization generator 860 to compute descriptions, estimates, or measurements related to the entities and the event that gave rise to the dynamic relations among those entities. FIG. 12 shows exemplary types of information that can be obtained based on the identified event and related entities to enrich the detected event. An event can be described by event characterization 1210. Such characterization may include entity related characterization 1220 and event related characterization 1230. In some embodiments, entity related characterization may include a general profile of the entity 1240 (e.g., a general profile of Tiger Woods as a star in golf), event specific entity profile 1250 (e.g., summary of specific role of Tiger Woods in the sex scandal event), . . . , or entity related measures 1260 (e.g., a qualitative or quantitative measure indicating the level of participation of the entity in the detected underlying event (e.g., the degrees of involvement for Rachel Uchitel and Erin Nordegren in Tiger Woods' sex scandal event are different). Such measure may be estimated based on the number and strength of pairwise relationships within the event cluster or the clique representing the event. For instance, an attribute associated with each edge in the cluster indicating the strength of a connection between two entities (e.g., computed based on the amplitude of the co-peaks during the same period) may be used to compute the degree of involvement of each entity in the underlying event. In the Tiger Woods sex scandal example, it is conceivable that Rachel Uchitel's name was mentioned much more often than Erin Nordegren's so that the co-peak strength between Tiger Woods and Rachel Uchitel is likely much stronger than that between Tiger Woods and his wife Erin Nordegren. In this case, the involvement scores for both Tiger Woods and Rachel Uchitel are higher than that of Erin Nordegren. One example computation for an involvement score is formulated as follows:

$$I(e,v) = (\Sigma_{e \text{ is not } e'} s(e,e'))/N$$

where e and e' represent different nodes (or entities), s(e,e') represents a score indicating the strength of an edge linking node e and e', and N is a normalization factor which may be set to be the total strength of all edges linking to node e.

In some embodiments, event related characterization may include a description of the detected underlying event 1280. In some embodiments, such a description may be obtained based a set of keywords extracted from content from which dynamic relationships corresponding to the same event are identified. In some embodiments, instead of keywords, a brief summary may be obtained based on the same content. Any known technologies, existing or developed, for generating a description of an event may be utilized. In addition, as shown in FIG. 12, event related characterization may also include some information reflecting the popularity or impact of the underlying event 1290. Event popularity may refer to the ranking of detected events based on the importance of the event when the event is correctly identified. For example, Tiger Woods' sex scandal may be wide spread within the U.S. but may not have the same level of importance internationally. But the election result in the United States for president may be much more popular or have a bigger impact internationally.

In some embodiments, to estimate the popularity of an event, query logs volume generated by a specific event may be used as a feature in estimating the popularity. Specifically, different measurements may be computed based on query log. For example, the number of times keywords in an event description or number of queries for each entity participating in an event occurred within the same time period as the detected event can be calculated based on a query log. Such computed measures may then be aggregated and weighted by the relevance of each keyword and involvement scores of each entity to determine the total event popularity.

Another example of event related characterization may include some metric indicating the confidence in the detection of the underlying event 1270. An event confidence score reflects the level of belief that the event is correctly identified. To obtain such a measure, it may be relevant to determine whether the entities identified to be connected by dynamic relations likely should be connected. Such a measure may be derived based on a probability of connectedness on each edge. For example, if each edge in a clique or sub-graph (representing an event and the participating entities) has an attribute representing the probability that the two entities in the real world are actually related, the confidence for the underlying event may be computed based on the following formula:

$$C(v) = \Sigma_{S \in \Phi}(\text{Ind}(v/S) \times \Pi_{r \in \Phi} s(r) \times \Pi_{r \text{ not } \in \Phi}(1-s(r)))$$

where $\Phi = 2^R$, r is an edge in the clique, s(r) is the weight of the edge, and Ind (v/S) is an indicator variable that is equal to one if the restriction v/s to the edges in S is connected, and zero otherwise. According to this formula, it adds the probability of every combination of inclusion/omission of edges that result in a collection of all nodes in the clique being connected. Although in the illustrated formula, all possible subsets are enumerated to compute the confidence score C(v) for the event, it is understood that enumeration is not required. In addition, other techniques may also be employed to implement the computation of the confidence score for the detected event and all such implementations are within the scope of the present teaching.

Figure 9:
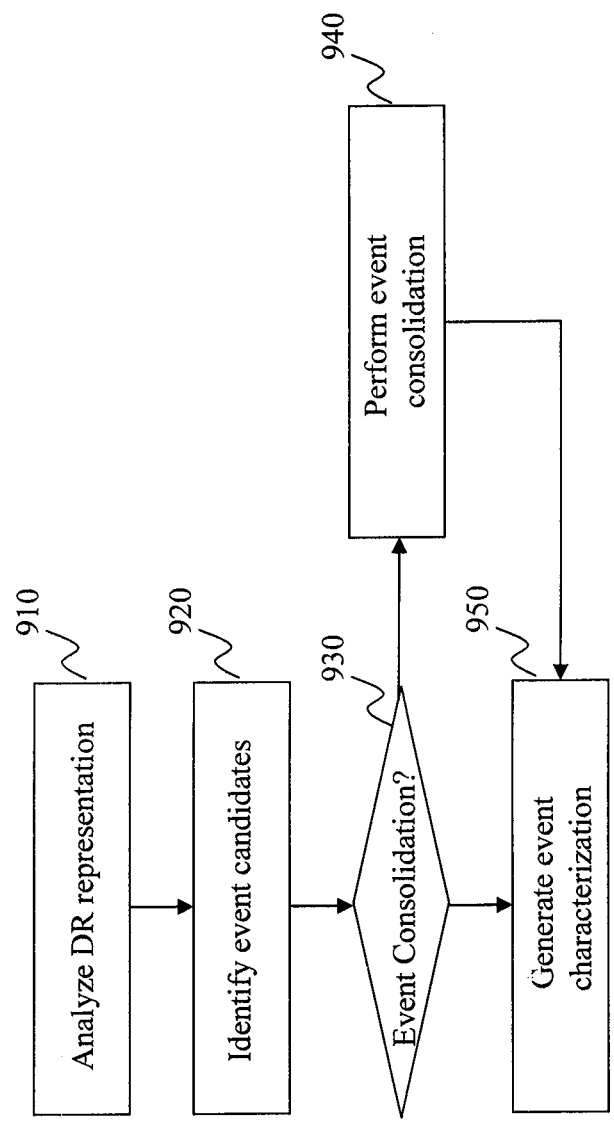
FIG. 9 is a flowchart of an exemplary process in which the dynamic event detector identifies a dynamic event that connects different entities, according to an embodiment of the present teaching.

FIG. 9 is a flowchart of an exemplary process in which the dynamic event detector 250 identifies a dynamic event that connects different entities, according to an embodiment of the present teaching. A dynamic relation representation is first received and analyzed at 910. One or more event candidates are then identified at 920. It is then determined, at 930, whether any event consolidation is to be performed. If event consolidation is to be performed, the detected event candidate is forwarded so that event consolidation can be performed at 940. Once an event is detected, either with or without event consolidation, an event characterization is generated at 950.

Figure 10:
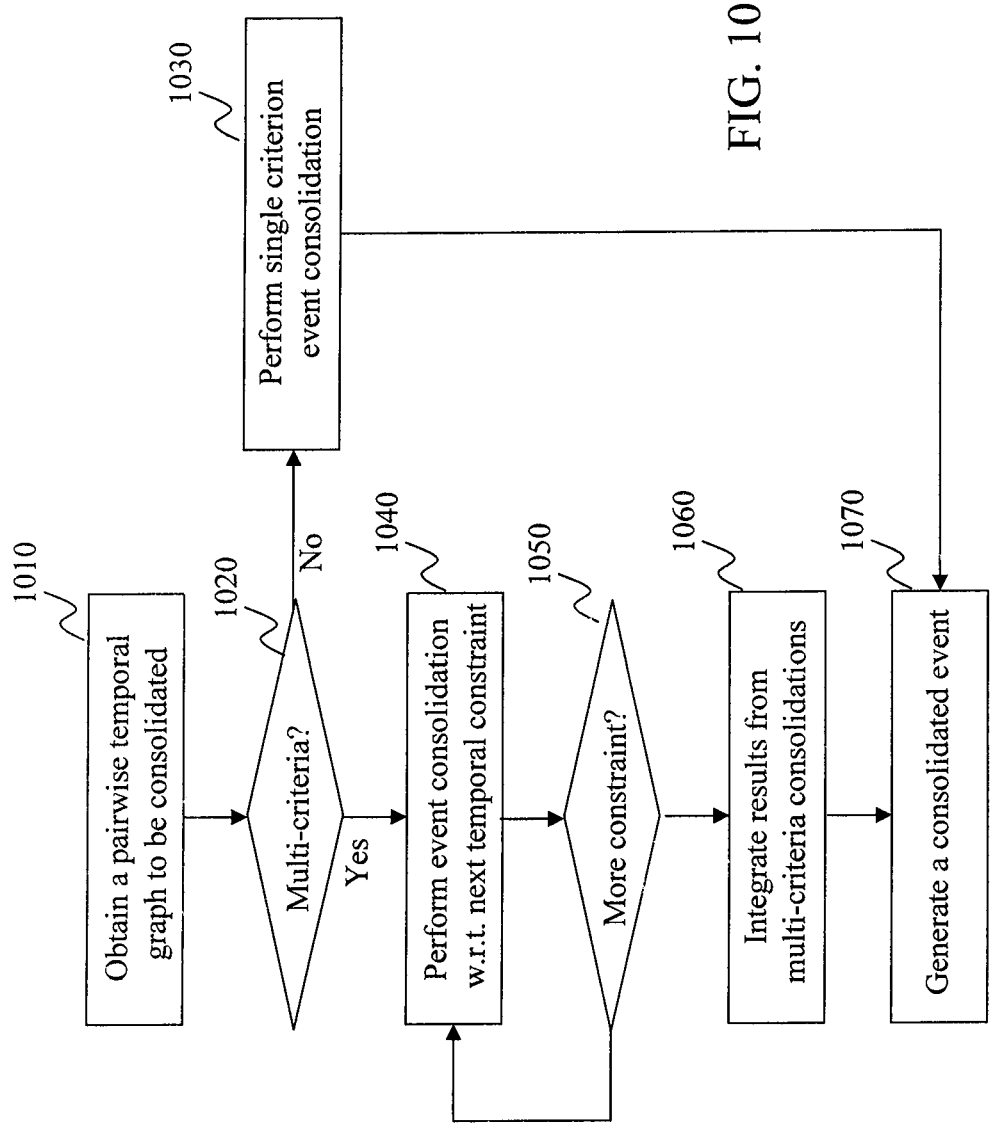
FIG. 10 is a flowchart of an exemplary process in which the dynamic event detector performs event consolidation, according to an embodiment of the present teaching.

FIG. 10 is a flowchart of an exemplary process in which the dynamic event detector 250 performs event consolidation, according to an embodiment of the present teaching. A pairwise temporal graph to be consolidated is first obtained at 1010. It is determined, at 1020, whether the event consolidation is to be based on a single or multiple temporal constraints. If there is a single temporal constraint employed for event consolidation, the dynamic event detector 250 performs, at 1030, event consolidation based on the single temporal constraint. For example, such a single temporal constraint can be a global temporal constraint or a local temporal constraint. If the event consolidation is to be performed with respect to more than one temporal constraint, the dynamic event detector 250 performs, at 1040, event consolidation with respect to a next temporal constraint. Whenever there are more temporal constraints remaining to be considered for event consolidation, determined at 1050, the processing returns to 1040 for event consolidation based on the next temporal constraint. When all the temporal constraints are considered and used to yield results for event consolidation, such results may then be merged or integrated at 1060. Based on the integrated result, a consolidated event taking into account temporal constraints is generated at 1070. As discussed above, FIGS. 11(*b*) and (*c*) illustrate consolidated events identified based on a pairwise temporal graph shown in FIG. 11(*a*).

To implement the present teaching, computer hardware platforms may be used as the hardware platform(s) for one or more of the elements described herein (e.g., the temporal peak based DRC detector (TPDD) 230, the dynamic relation extractor (DRE) 240, the dynamic event detector (DED) 250, and relationship description generator (RDG) 260). The hardware elements, operating systems and programming languages of such computers are conventional in nature, and it is presumed that those skilled in the art are adequately familiar therewith to adapt those technologies to implement the DCP processing essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 13:
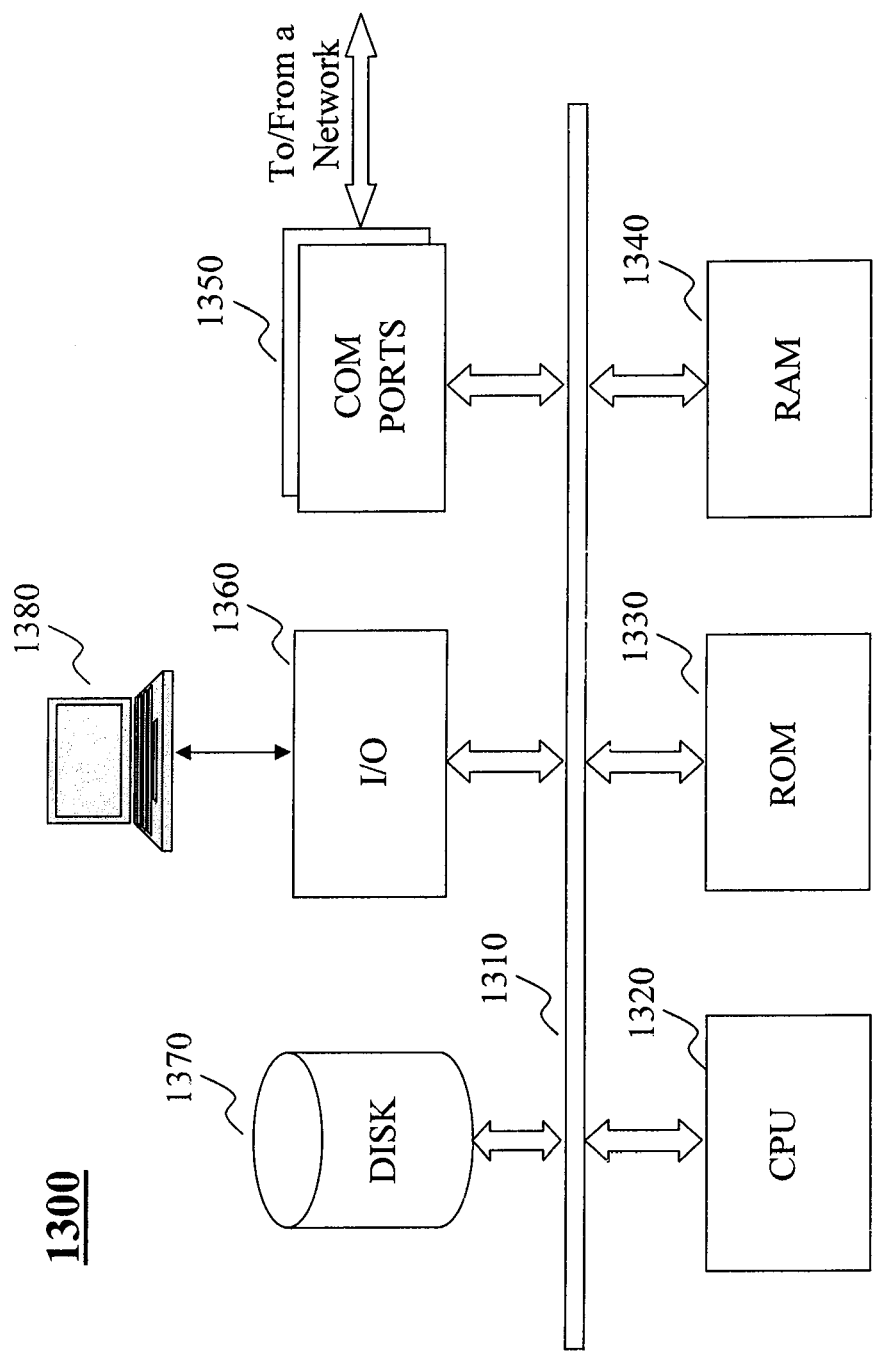
FIG. 13 depicts a general computer architecture on which the present teaching can be implemented.

FIG. 13 depicts a general computer architecture on which the present teaching can be implemented and has a functional block diagram illustration of a computer hardware platform which includes user interface elements. The computer may be a general purpose computer or a special purpose computer. This computer 1300 can be used to implement any components of the dynamic web page generation architecture as described herein. For example, the temporal peak based DRC detector (TPDD) 230 that identifies dynamic relation candidates based on content from a first data source, the dynamic relation extractor (DRE) 240 that detect dynamic relations among entities based on corroboration across different independent data sources, the dynamic event detector (DED) 250 that detect events that gave rise to dynamic relationships among entities, and the relationship description generator (RDG) 260 that generates characterizations of events and entities participating in the events based on accessible information, can all be implemented on a computer such as computer 1300, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 1300, for example, includes COM ports 1350 connected to and from a network connected thereto to facilitate data communications. The computer 1300 also includes a central processing unit (CPU) 1320, in the form of one or more processors, for executing program instructions. The exemplary computer platform includes an internal communication bus 1310, program storage and data storage of different forms, e.g., disk 1370, read only memory (ROM) 1330, or random access memory (RAM) 1340, for various data files to be processed and/or communicated by the computer, as well as possibly program instructions to be executed by the CPU. The computer 1300 also includes an 110 component 1360, supporting input/output flows between the computer and other components therein such as user interface elements 1380. The computer 1300 may also receive programming and data via network communications.

Hence, aspects of the methods of receiving user queries and returning a response, e.g., a URL associated with dynamically generated web pages or the content contained in the dynamically generated web pages, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other DCP service provider into the hardware platform(s) of a computing environment or other system implementing a computing environment or similar functionalities in connection with generating the dynamic web pages based on user queries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier. wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for providing a search result, comprising:
   obtaining a query from a user, wherein the query is included in a query log associated with the user and the query log includes a first piece of information;
   determining one or more data sources that are connected to the network through one or more access points;
   identifying a second piece of information from the one or more data sources based on a time-dependent relationship between the first piece of information and the second piece of information;
   generating a search result by searching online content based on the second piece of information; and providing the search result to the user as a response to the query.

2. The method of claim 1, wherein the one or more access points include location information of the user.

3. The method of claim 1, wherein the time-dependent relationship is determined based on one or more events.

4. The method of claim 3, wherein the identifying comprises:
determining a popularity for each of the one or more events;
ranking the one or more events based on their respective popularities;
determining the time-dependent relationship based on the ranked one or more events; and
identifying the second piece of information based on the time-dependent relationship.

5. The method of claim 4, wherein the popularity is determined for each event based on number of previously submitted queries related to the event.

6. The method of claim 3, wherein the one or more events are generated by merging a plurality of event candidates based on one or more temporal constraints.

7. The method of claim 6, wherein the one or more temporal constraints include at least one of:
a global temporal constraint specifying a maximum length of time between two event candidates to be merged; and
a local temporal constraint requiring two event candidates to be merged share a common time period.

8. A system having at least one processor, storage, and a communication platform connected to a network for providing a search result, comprising:
a data analyzer configured for obtaining a query from a user, wherein the query is included in a query log associated with the user and the query log includes a first piece of information;
a dynamic relation candidate detector configured for determining one or more data sources that are connected to the network through one or more access points;
a dynamic event detector configured for identifying a second piece of information from the one or more data sources based on a time-dependent relationship between the first piece of information and the second piece of information; and
a management server configured for generating a search result by searching online content based on the second piece of information and providing the search result to the user as a response to the query.

9. The system of claim 8, wherein the one or more access points include location information of the user.

10. The system of claim 8, wherein the time-dependent relationship is determined based on one or more events.

11. The system of claim 10, wherein the dynamic event detector comprises:
an event characterization generator configured for determining a popularity for each of the one or more events and ranking the one or more events based on their respective popularities; and
an event identification controller configured for determining the time-dependent relationship based on the ranked one or more events and identifying the second piece of information based on the time-dependent relationship.

12. The system of claim 11, wherein the popularity is determined for each event based on number of previously submitted queries related to the event.

13. The system of claim 10, wherein the one or more events are generated by merging a plurality of event candidates based on one or more temporal constraints.

14. The system of claim 13, wherein the one or more temporal constraints include at least one of:
a global temporal constraint specifying a maximum length of time between two event candidates to be merged; and
a local temporal constraint requiring two event candidates to be merged share a common time period.

15. A machine-readable tangible and non-transitory medium having information for providing a search result, wherein the information, when read by the machine, causes the machine to perform the following:
obtaining a query from a user, wherein the query is included in a query log associated with the user and the query log includes a first piece of information;
determining one or more data sources that are connected to the network through one or more access points;
identifying a second piece of information from the one or more data sources based on a time-dependent relationship between the first piece of information and the second piece of information;
generating a search result by searching online content based on the second piece of information; and
providing the search result to the user as a response to the query.

16. The medium of claim 15, wherein the one or more access points include location information of the user.

17. The medium of claim 15, wherein the time-dependent relationship is determined based on one or more events.

18. The medium of claim 17, wherein the identifying comprises:
determining a popularity for each of the one or more events;
ranking the one or more events based on their respective popularities;
determining the time-dependent relationship based on the ranked one or more events; and
identifying the second piece of information based on the time-dependent relationship.

19. The medium of claim 18, wherein the popularity is determined for each event based on number of previously submitted queries related to the event.

20. The medium of claim 17, wherein the one or more events are generated by merging a plurality of event candidates based on one or more temporal constraints.

21. The medium of claim 20, wherein the one or more temporal constraints include at least one of:
a global temporal constraint specifying a maximum length of time between two event candidates to be merged; and
a local temporal constraint requiring two event candidates to be merged share a common time period.

* * * * *